Figure 1:
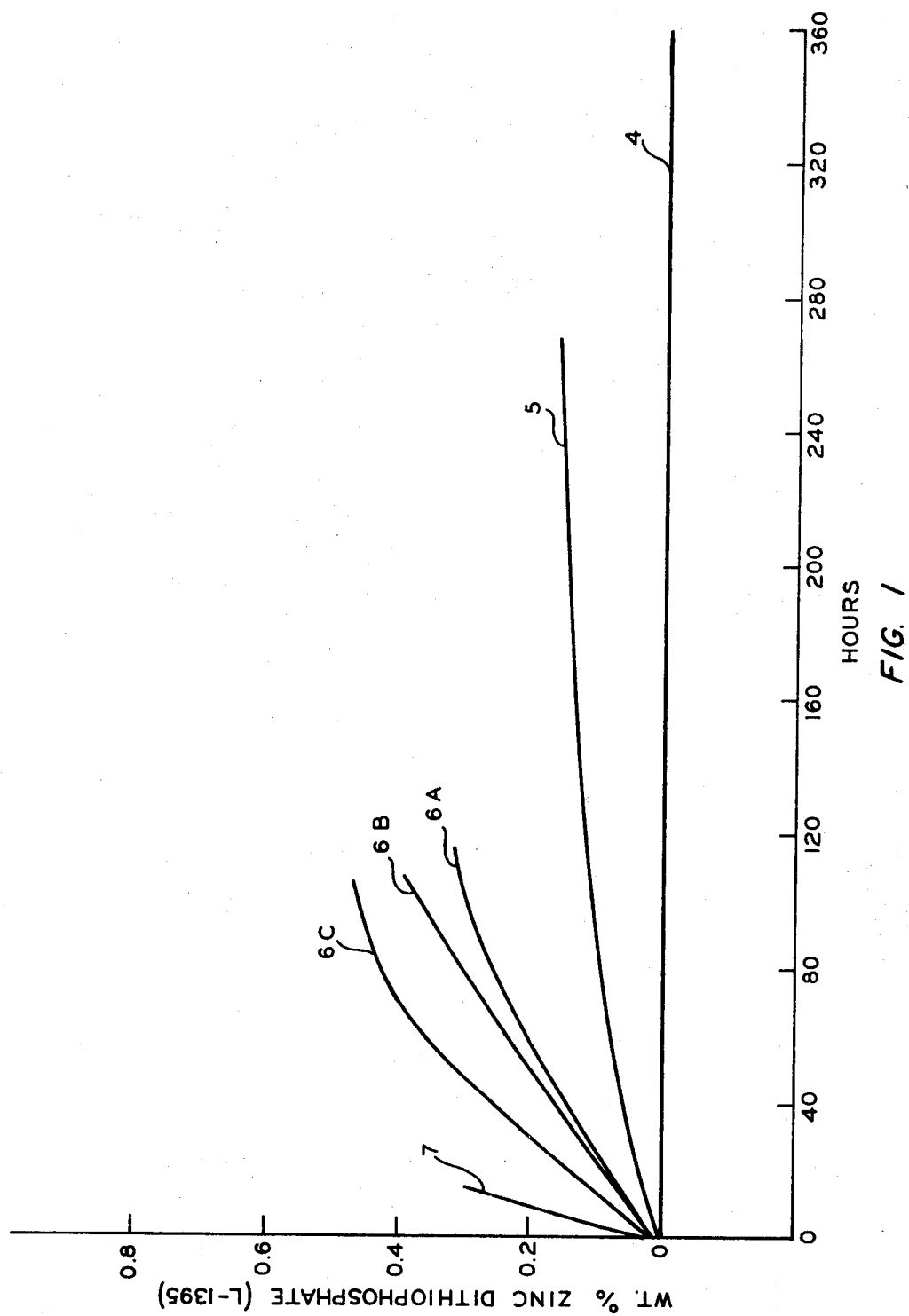

United States Patent [19]

Rohde

[11] 4,066,559
[45] Jan. 3, 1978

[54] CONTAINER FOR OIL-ADDITIVE RELEASE

[75] Inventor: Raymond Rohde, Bartlesville, Okla.

[73] Assignee: Phillips Petroleum Company, Bartlesville, Okla.

[21] Appl. No.: 361,372

[22] Filed: May 17, 1973

Related U.S. Application Data

[62] Division of Ser. No. 73,789, Sept. 21, 1970, Pat. No. 3,749,247.

[51] Int. Cl.$^2$ .............................................. C10M 1/48
[52] U.S. Cl. ...................................... 252/10; 184/1 E; 252/32.7 E; 252/33; 252/51.5 A; 252/316
[58] Field of Search ...................... 252/16, 25, 32.7 E, 252/316, 10; 184/1 E

[56] References Cited

U.S. PATENT DOCUMENTS

| 2,969,330 | 1/1961 | Brynko .................................. 252/316 |
| 2,969,331 | 1/1961 | Brynko et al. ........................ 252/316 |
| 3,460,972 | 8/1969 | Nack ..................................... 252/316 |
| 3,505,244 | 4/1970 | Cessna ............................. 252/316 X |
| 3,669,637 | 6/1972 | Klass et al. ............................. 48/195 |

OTHER PUBLICATIONS

Herbig; James A., "Microencapsulation", pp. 436–456, Kirk-Othmer Encyclopedia of Chem. Tech., vol. 13, 2nd Ed., 1967.
Smalheer et al., "Lubricant Additives", 1967, p. 7.

*Primary Examiner*—Delbert E. Gantz
*Assistant Examiner*—Andrew H. Metz

[57] ABSTRACT

Addition of oxidation inhibitor (antioxidant) or other additive to lubricating oil as in a working engine is effected by placing into the oil a container, e.g., a polyolefin container or capsule, for example, a polypropylene capsule containing said additive which permeates through the container wall into the oil gradually. A polypropylene capsule containing zinc dialkyldithiophosphate is described. Other container materials and other polyolefin, e.g., polyethylene and copolymers of monoolefins such as ethylene-propylene copolymers can be used. The container or capsule is found to release increasing quantities of additive as the oil temperature surrounding the same increases, with container rupture at extreme operating conditions of temperature to release remaining additives to further protect the oil under such conditions.

12 Claims, 2 Drawing Figures

CONTAINER FOR OIL-ADDITIVE RELEASE

This is a division of application Ser. No. 73,789, filed Sept. 21, 1970, now allowed and U.S. Pat. No. 3,749,247.

This invention relates to the addition of oxidation inhibitor (antioxidant) or other additive to a lubricating oil as in a working engine. It also relates to protection of an oil as in a working engine at elevated temperature against oxidation or other deterioration. Further, the invention relates to a gradually adding or dosing an inhibitor into a substance such as an oil under elevated temperature conditions as can prevail in a working engine.

According to a concept of the invention, it provides a container containing an additive to be added to an oil, the container walls being of a material selected to permit the additive to permeate therethrough into the oil to which the inhibitor is to be added. In another of its concepts, the invention provides such a container the walls of which are responsive to increase in temperature to permit increased permeation therethrough of an oil additive.

It has been found that at elevated crankcase temperatures, particularly in cases of severe high temperature engine operation such as in the high speed towing of house or boat trailers, an oil thickening problem, even to the extent of oil gelling, arises. It has been found that after a number of hours of severe engine operation even with a high quality detergent type oil, the oil viscosity begins to increase rather rapidly. It has further been found that this extreme rate of viscosity increase coincides with depletion of oxidation inhibitor which, in turn, permits increased oxidation of the oil. Indeed, in one severe test during which a charge of oxidation inhibitor was added to the oil periodically, a rapid increase in viscosity could be avoided.

I have now conceived that the periodic addition of additive can be dispensed with if there is placed into the lubricating oil in the engine a capsule container or "bottle" which, in effect, encloses a predetermined or measured amount of an oxidation inhibitor, for example, zinc dialkyldithiophosphate. It has occurred to me that the capsule can be inserted into a standard oil filter, where it will be washed by the oil passing through the same. Still further, a now perferred capsule or "bottle" is one made from a polypropylene. Further, I have found the permeation of the zinc dialkyldithiophosphate through the capsule varies with the temperature of the oil passing through the filter with permeation being greatest at highest temperatures and, therefore, when most needed.

An object of this invention is to provide for addition of inhibitor to lubricating oil. A further object of the invention is to provide for the gradual addition of an oil additive such as an oxidation inhibitor to an oil. Still further, it is an object of this invention to provide in an operating engine the addition of an inhibitor such as an oxidation inhibitor to the oil wherein which oil is at an elevated temperature. It is a still further object of the invention to provide for increased addition of inhibitor to oil as the temperature of the oil increases. A further object still of the invention is to provide for a sudden release of the inhibitor into an oil when said oil reaches a temperature ordinarily encountered under extremely severe operating conditions. A further object still is to provide a container containing an oxidation inhibitor or other oil additive, the container having the property of gradually releasing inhibitor therefrom at elevated temperature. Further still, an object of the invention is to provide for such a container containing an additive which the container will release in toto under extremely severe operating temperature.

Other aspects, concepts, objects and several advantages of the invention are apparent from a study of this disclosure, the drawings and the appended claims.

According to the present invention, an oil additive such as an oxidation inhibitor is capsulated or bottled in a container, at least a portion of the wall of which is made of a material which permits oil to permeate therethrough at an elevated temperature, for example, a temperature reached by oil in an engine under operating conditions.

Further, according to the invention, there is provided a polyolefin, e.g., polyethylene, polypropylene, ethylene-propylene copolymer, container containing an oil additive.

Still further, according to the invention, there is provided in an operating engine a container containing an additive as herein described.

The shape, size, wall thickness, and other physical factors affecting the desired degree or rate of permeation and, in the extreme case, the rupture of the container can be determined by mere routine testing under actual operation conditions of temperature of the oil to be inhibited.

The nature of the plastic, polymer, or copolymer can also be varied and can be determined by mere routine testing.

In a preferred embodiment, the shape and size of the plastic oil additive container is such that it can occupy a space extant in present engine oil filters, such as those commonly in use on motor vehicles. This will have the advantage of reducing the amount of oil needed to fill the unit without significantly reducing its ability to filter. This feature of the invention, namely the combination of the filter element and the plastic, oil additive container, is particularly advantageous when using heavy duty or high detergency oils where the filter functions mainly to arrest the solids which are not carried by the oil.

Generally speaking, the choice of polymer, the wall thickness of the polymeric container, the size and location of the container, the amount and concentration of the oil additive within the container, and other such variables will be such as to provide little or no permeation at engine oil temperatures up to about 200° F., moderate permeation at 200°–250° F., substantial permeation at 250°–300° F., and still greater permeation and/or rupture of the walls of the container at 300°–325° F. Such a schedule is particularly applicable for oil additives, such as antioxidants, for which there is a greater need as crankcase temperatures increase.

The wall thickness of the plastic container, depending upon the specific application and result desired, will generally be in the range of 5–50, preferably 20–35, mils. In a typical oil filter, the plastic container can be in the general form of a relatively long narrow tube of a size and shape to conveniently fit into the generally triangular voids which exist between the pleats or folds on the inlet side of a typical filter element. One or more such containers can be used in one or more of such spaces. As an example, the plastic container can be a tube about 1–4 inches long and ¼–1 inch in diameter.

The plastic container of oil additive can be utilized in still other locations within the crankcase or within the oil circulation line separate from the oil filter. Any location at which the plastic container can be contacted with at least a portion of the lubricating oil at a temperature which is representative of the temperature of the bulk of the lubricating oil. In such a location, the plastic containers can be replaced at suitable intervals.

The process of the invention is applicable for use in engine oil lubricating systems using any suitable lubricating oil compositions and any suitable viscosity grades such as the conventional SAE 10 to SAE 50 grades.

In addition to antioxidants, such as zinc dialkyldithiophosphates, other polyolefin-permeable oil additives can also be used. Preferably, to insure compatibility, the oil additives in the plastic container should be the same or similar to those already in the oil. However, a number of additives including the zinc dialkyldithiophosphates, have essentially universal compatibility and utility in all lubricating oil formulations.

The permeable oil additives can be present in the plastic container either diluted or undiluted with a carrier oil. If the additive is already in the liquid form it can be used in that state but dilution with at least a minor quantity of a suitable hydrocarbon liquid, preferably a lubricating oil, is preferred in order to speed diffusion of the additive through the walls of the plastic container. Any lubricating oil or lubricating oil fraction is suitable as a diluent. The lighter lubricating oils will promote permeation to a greater degree than heavier fractions. Thus, diluents can be present in amounts in the range of 0–50 parts diluent per part additive, by weight.

The polymers from which the plastic containers can be fabricated can be any through which liquid oil additives or their solutions can slowly diffuse and which do not melt or significantly soften at temperatures below the operating temperature range of a given lubricating oil in a crankcase. Generally speaking, hydrocarbon polymers are operable and polymers and copolymers of 1-olefins are very satisfactory. Polystyrene can be permeated by suitable oil additives but its relatively low melting point restricts its use to relatively low temperature lubricating oil systems or to systems where rupture of the oil additive container and a sudden release of additive is desired at an intermediate temperature. Polyethylene is in this same general class in that it is permeable but relatively low melting. The preferred hydrocarbon polymers are polypropylene and copolymers of propylene with minor amounts of 1-olefin comonomers having up to about 8 carbon atoms per molecule.

The amount of oil additive within the plastic container can vary over a wide range and will depend upon the nature of the additive and the amount of oil in the lubricating oil reservoir. Frequently, the amount of supplemental additive, such as an antioxidant, in the plastic container will be in the range of from about 0.5 to about 5 times the amount of the same additive present in the oil at the initial charging or formulating. As an example, a new lubricating oil can contain about 0.74 weight per cent of a zinc dialkyldithiophosphate additive or about 0.068 lb. of the additive per gallon. Hence, a typical amount of the zinc additive in the plastic container can be about 0.068 lb. for each gallon of oil in the crankcase.

The following examples illustrate the invention.

EXAMPLE 1

The permeation of an oil solution of a commonly used oil antioxidant additive through the walls of a propylene-ethylene copolymer container, which was submerged in a lubricating oil, was carried out at several different temperatures. The antioxidant additive was a commercial zinc dialkyldithiophosphate, hereinafter referred to simply as L-1395. This commercially available (Lubrizol Corporation, Cleveland, Ohio) additive contains a mixture of isobutyl and amyl alkyl groups, has a specific gravity of about 1.18, and typically contains about 9.5 per cent P, 20.0 per cent S, and 10.6 per cent Zn, by weight. The commercial material also normally contains a minor amount of diluent or carrier oil. For simplicity, the presence of this carrier oil was neglected in the computations which follow.

The polymeric container through which the oil additive was permeated was a 1-ounce capacity bottle of a commercial propylene-ethylene copolymer resin (Nalgene, Catalog No. 2006, Nalge Company, Rochester, New York). The predominantly propylene polymer contained from about 2 to about 5 weight percent ethylene and had a melting point of about 327° F. The bottle fashioned from this resin had an average wall thickness of about 30 mils.

Into each plastic bottle was placed 1 g of L-1395 and 9 g of a 10-stock lubricating oil. The 10-stock lubricating oil was a lubricating fraction of a highly refined mid-continent curde oil having a viscosity suitable for formulation into an SAE 10 grade motor oil. Its viscosity was about 100 SUS at 100° F. The bottles were then capped and submerged in a beaker containing 150 g of 10-stock oil. The bottles were submerged in the oil either by the weight of a steel ball placed inside the bottle or by fastening the cap of the bottle to the beaker cover.

Using duplicate samples, the beakers containing the oil and the plastic bottles with the oil additive contained therein, were stored at different temperatures. Periodically, the oil in the beaker, but outside the plastic container, was analyzed for the additive content. Results of these tests are shown in Table 1.

Table 1

Permeation of L-1395 Through Propylene-Ethylene Copolymer Bottle Into Engine Oil at Various Temperatures

| Runs at 75° F. | | Runs at 200° F. | | Runs at 250° F. | | Runs at 295° F. | |
|---|---|---|---|---|---|---|---|
| Hours | Permeated [a] Additive, % | Hours | Permeated [a] Additive, % | Hours | Permeated [a] Additive, % | Hours | Permeated [b] Additive, % |
| Sample #1 | | Sample #1 | | Sample #1 | | Sample #1 | |
| 0 | 0 | 0 | 0 | 0 | 0 | 0 | 0 |
| 96 | 0 | 72 | 0.100 | 23 | 0.090 | 5 | 0.10 |
| 216 | 0 | 168 | 0.130 | 71 | 0.230 | 12 | 0.64 |
|  |  | 216 | 0.150 | 97.5 | 0.290 | 23 | 0.91 |
| Sample #2 | | Sample #2 | | Sample #2 | | Sample #2 | |
| 0 | 0 | 0 | 0 | 0 | 0 | 0 | 0 |

Table 1-continued

Permeation of L-1395 Through Propylene-Ethylene Copolymer Bottle
Into Engine Oil at Various Temperatures

| Runs at 75° F. | | Runs at 200° F. | | Runs at 250° F. | | Runs at 295° F. | |
|---|---|---|---|---|---|---|---|
| | Permeated [a] | | Permeated [a] | | Permeated [a] | | Permeated [b] |
| Hours | Additive, % | Hours | Additive, % | Hours | Additive, % | Hours | Additive, % |
| 168 | 0 | 48 | 0.050 | 25 | 0.150 | 5 | 0.09 |
| 254 | 0 | 96 | 0.090 | 47 | 0.290 | 12 | 0.77 |
| 360 | 0 | 192 | 0.125 | 98 | 0.445 | 23 | 0.91 |
| | | 240 | 0.160 | | | | |

[a] In terms of the concentration of the additive found in the oil outside the container. Maximum concentration would be about 0.6 weight per cent.
[b] 100 g oil, instead of 150 g, in oil bath, hence maximum about 1 weight per cent.

In the Table 1, it is seen that in the runs carried out at 75° F. there was no diffusion of the oil additive from its plastic container into the bulk of the oil. Thus, at a temperature which is below the normal operating temperature of an engine, there would be no movement of the additive from its container.

In runs at 200° F., 250° F., and 295° F., on the other hand, the data indicate that there was substantial diffusion of the additive into the bulk of the oil and the rate of diffusion increased with the temperature. Thus, the movement of additive out of its container and into the bulk of the oil would be directly proportional with the severity of operation and, hence, proportional with the need.

EXAMPLE 2

Several additional runs were carried out in essentially the same manner as described in Example 1 to show the effect of increasing the concentration of the oil additive in the plastic bottle and the effect of increasing the quantity of the oil additive in the plastic bottle. These results are shown in Table 2.

Table 2

Permeation of L-1395 at 250° F. Through Propylene-Ethylene Copolymer at Different Concentrations

| Bottle Contains 5 g Additive and 5 g 10-Stock and is Immersed in 150 g 10-Stock | | Bottle Contains 2 g Additive and 18 g 10-Stock and is Immersed in 150 g of 10-Stock | |
|---|---|---|---|
| Hours | Permeated [a] Additive, % | Hours | Permeated [b] Additive, % |
| Sample #1 | | Sample #1 | |
| 0 | 0 | 0 | 0 |
| 23.5 | 0.510 | 23 | 0.450 |
| 72 | 1.200 | 71 | 0.890 |
| 97.5 | 1.430 | 97.5 | 1.000 |
| Sample #2 | | Sample #2 | |
| 0 | 0 | 0 | 0 |
| 25 | 0.495 | 25 | 0.405 |
| 48 | 0.801 | 47 | 0.585 |
| 97.5 | 1.130 | 73 | 0.815 |
| | | 98 | 0.950 |

[a] In terms of concentration of additive found in oil outside bottle. Maximum concentration would be about 3 weight per cent.
[b] Maximum concentration would be about 1.3 per cent.

The data in Table 2 show that the amount of oil additive, such as the L-1395, which permeates through the wall of a given container can be increased by either increasing the concentration of the additive inside the container or by increasing the amount of additive inside the container, or both. This demonstrates the effectiveness of still another variable which can be utilized to control the addition rate of a given additive into a body of lubricating oil according to the process of this invention.

The L-1395 additive, in its liquid but relatively undiluted commercial form, was also found to permeate satisfactorily but at a somewhat slower rate.

EXAMPLE 3

The diffusion of the L-1395 oil additive through a container fashioned from a propylene homopolymer was demonstrated. The container was a 250 ml capacity bottle also having a wall thickness of about 30 mils, and prepared from a homopolymer of propylene having a melting point of about 340° F.

Runs at 250° and 295° F. were carried out. Into the bottle of each run was placed 60 grams of a 10 weight per cent solution of L-1395 in 10-stock oil. The bottle was then submerged by means of a steel ball within the bottle in another vessel containing 900 grams of the 10-stock oil. The vessels were then placed in storage at different temperatures and periodically the oil outside the plastic bottle was analzyed for L-1395 contact. The results of these tests are shown in Table 3.

Table 3

Permeation of L-1395 Through Propylene Homopolymer Bottle into Engine Oil

| Run at 250° F. | | Run at 295° F. | |
|---|---|---|---|
| Hours | Permeated [a] Additive, % | Hours | Permeated [a] Additive, % |
| 0 | 0 | 0 | 0 |
| 24 | 0.095 | 3.5 | 0.075 |
| 48 | 0.190 | 9 | 0.195 |
| 72 | 0.275 | 15 | Ruptured |
| 98 | 0.375 | | |

[a] In terms of concentration of additive found in the oil outside the plastic container. Maximum concentration would be about 0.6 weight per cent.

The data in Table 3 show that the container of propylene homopolymer is also satisfactory for oil additive diffusion according to the process of the present invention and it also shows that larger containers are as effective as small containers for this use. The run at the relatively extreme temperature of 295° F. also illustrates the feature of the invention in which a sudden release of an oil additive, such as an antioxidant, can be effected by the rupture of a plastic container. The rupture which occurred after about 15 hours at 295° F. in this particular system was undoubtedly hastened to some degree by the presence of the steel balls which exerted some stress upon the walls of the somewhat soft container. However, the rupture temperature can also be satisfactorily controlled by the choice of polymer or copolymer of a different softening or melting temperature.

EXAMPLE 4

The satisfactory diffusion of still other commonly used oil additives through the wall of a plastic container according to the process of this invention was also demonstrated. In one run, a commercial sulfonate oil additive A (Bryton-T Sulfonate, a sodium sulfonate) was tested in the manner of Example 1 and using the copolymer bottle of Example 1. Twenty grams of a 40 weight percent solution of the oil additive A in 10-stock oil was placed in the bottle.

Similarly, oil additive B (Paranox-64, a mixture of barium phenate and calcium sulfonate) was tested in the same propylene-ethylene copolymer bottle and in the same manner.

Still another commonly used oil additive, an ashless dispersant (Lubrizol 934) was also demonstrated as being suitable for use in the present invention. This additive is believed to be a mixture of 10 percent of a material which is a mixture of a polyisobutenyl succinimide and succinamide derived from polybutenyl succinic anhydride and alkenyl polyamines, and 90 percent of a polyisobutenyl succinic ester. The polyisobutenyl groups are derived from a polyisobutylene having a molecular weight in the range of 700–1500 (average of 1000).

A 10 g quantity of a 40 weight percent solution of oil additive C in 10-stock oil was charged into the one-ounce copolymer bottle and also submerged at 250° F. in a beaker containing 100 g of 10-stock oil.

The results of these tests are shown in Table 4.

Table 4

Permeation of Various Oil Additives at 295° F. Through Propylene-Ethylene Copolymer into Engine Oil

| Oil Additive A | | Oil Additive B | | Oil Additive C | |
|---|---|---|---|---|---|
| Hours | Permeated (a) Additive, % | Hours | Permeated (a) Additive, % | Hours | Permeated (b) Additive, % |
| 0 | 0 | 0 | 0 | 0 | 0 |
| 24 | 0.20 | 24 | 2.50 | 5 | 0.08 |
| 42 | 0.45 | 42 | 3.00 | 12 | 0.26 |
| 66 | 0.60 | 66 | 3.50 | 23 | 0.60 |
| 90 | 0.75 | 90 | 4.00 | 53 | 0.76 |
| | | | | 73 | 1.18 |
| | | | | 92 | 1.35 |
| | | | | 116 | 1.54 |
| | | | | 140 | 1.87 |

(a) In terms of concentration of additive found in oil outside bottle. Maximum concentration would be about 7 weight per cent.
(b) Maximum concentration about 3.5 per cent.

The data in Table 4 show that three other commonly used additives are also operable according to the present invention. It is seen that not all additives diffuse through a given polymer container at the same rate. However, not all oil additives are required in the same amounts within a given motor oil formulation and, with the number of variables available to control the release of each additive at the desired rate, it can be possible to replenish, on a continuous basis, each individual oil additive as it is consumed and while the engine is in operation.

In the drawing, FIG. 1 shows the effect of temperature upon the permeation of the zinc dialkyldithiophosphate through the walls of the polypropylene container and the ethylene-propylene copolymer container. The curves are graphical representations of the data in Tables 1 and 3. Curve 4 shows that essentially no permeation is observed at 75° F. Curve 5 shows increased permeation through the copolymer at 200° F. Curves 6A and 6C show still more permeation through the copolymer at 250° F. Curve 6B shows the relatively high rate of permeation at 250° F. through the propylene homopolymer container as well. Curve 7 shows the still more rapid rate of permeation through the homopolymer at 295° F.

Figure 2:
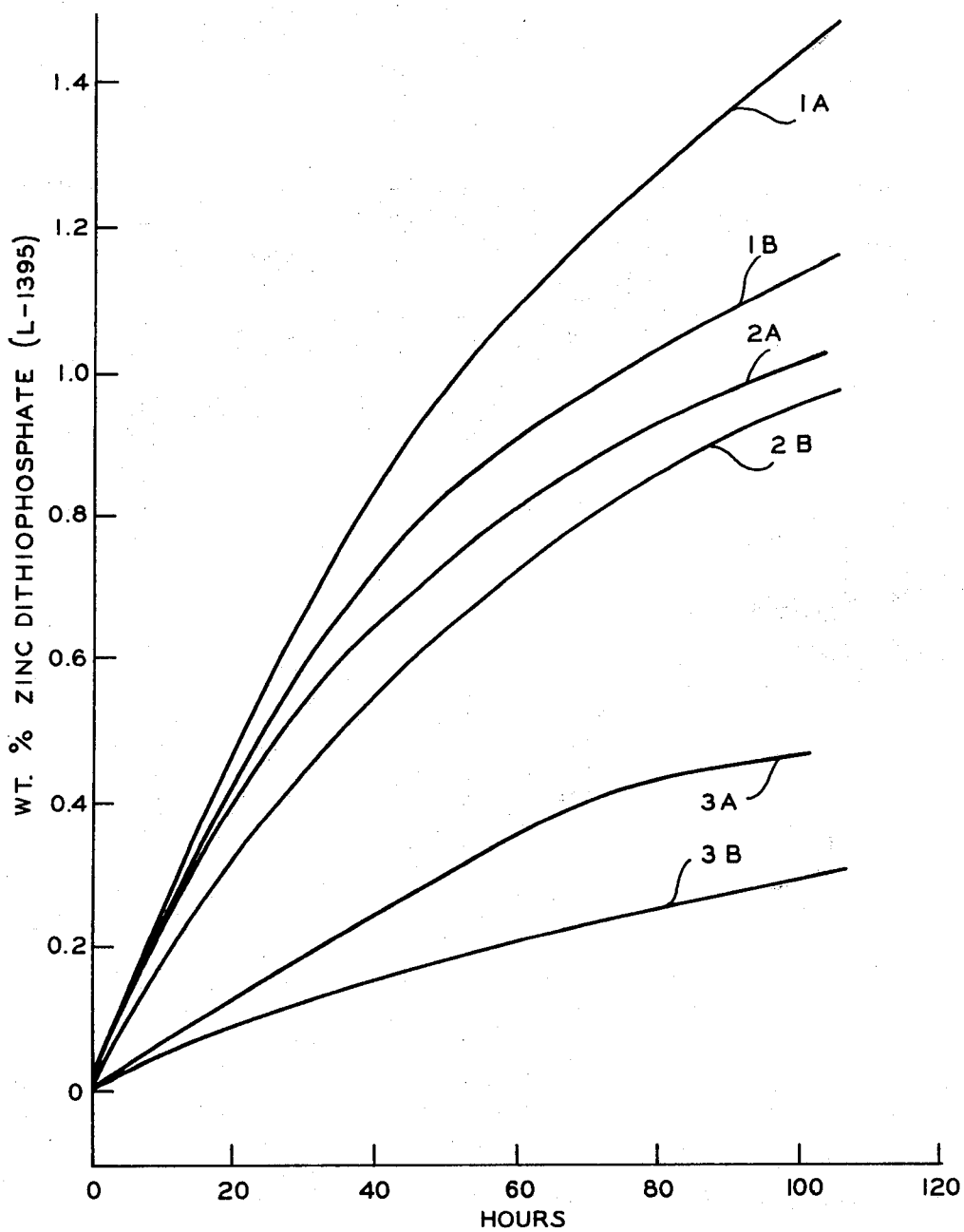

In FIG. 2 of the drawing, the effect of various concentrations and amounts of the zinc additive in the copolymer containers on the permeation rate is shown. The curves are the graphical representations of data in Tables 1 and 2. Curves 1A and 1B show the permeation rate of 10g of a 50 weight percent solution of the zinc additive. Curves 2A and 2B show the permeation rate of 20 g of a 10 weight percent solution, while curves 3A and 3B show the permeation rate of 10 g of a 10 weight percent solution.

Reasonable variation and modification are possible within the scope of the foregoing disclosure and the appended claims, the essence of which is that an additive is added to an oil, for example, an engine oil, during operation by encapsulating or enclosing the additive into a container capsule or "bottle" and permitting the container, capsule, or "bottle" to be washed by the oil at its operating temperature, thus, obtaining by permeation from within the container the additive into the oil desired to be protected.

I claim:

1. A method for protecting an oil by adding an additive thereto which comprises (1) enclosing the additive within a closed container said container made of a polymer that is permeable to said additive when said container is immersed in said oil at the operating temperature of the oil and (2) placing said container into said oil to be protected.

2. A method according to claim 1 wherein the container is made of a polyolefin which is oil permeable at a temperature elevated to the order of that reached by an engine oil in an operating engine, for example, an internal combustion engine.

3. A method according to claim 1 wherein the container, or at least a part of its wall, is composed of polyethylene, polypropylene, or a copolymer of propylene with 1-olefin monomers having up to about eight carbon atoms per molecule.

4. A method according to claim 1 wherein the additive is an oxidation inhibitor.

5. A method according to claim 4 wherein the inhibitor is zinc dithiophosphate.

6. A container containing an oil additive according to claim 1.

7. A container containing an oil additive according to claim 2.

8. A container containing an oil additive according to claim 3.

9. A container containing an oil additive according to claim 4.

10. A container containing an oil additive according to claim 5.

11. A method for protecting an oil by adding an additive thereto which comprises enclosing the additive within a container made of polymer which is oil permeable at an elevated temperature of the order of that reached by an engine oil when said oil is operating in an engine and immersing said container containing the additive in the oil in the engine.

12. A method for protecting an oil adding an additive thereto which comprises (1) enclosing the additive within a container the walls of which become increasingly permeable to said additive when said container is immersed in an oil to be protected and the temperature of the oil to be protected is increased and (2) placing said container containing said additive into said oil to be protected.

* * * * *